United States Patent
Tönnby et al.

(10) Patent No.: US 7,711,824 B2
(45) Date of Patent: May 4, 2010

(54) ARRANGEMENTS AND METHODS IN AN ACCESS SYSTEM

(75) Inventors: Ingmar Tönnby, Stockholm (SE); Ulf Larsson, Stockholm (SE); Tom Rindborg, Stockholm (SE); Joacim Halén, Sollentuna (SE); Eric Hjelmestam, Stockholm (SE); Egbert-Jan Sol, Eindhoven (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1431 days.

(21) Appl. No.: 10/503,184

(22) PCT Filed: Jan. 7, 2003

(86) PCT No.: PCT/SE03/00210

§ 371 (c)(1), (2), (4) Date: Mar. 3, 2005

(87) PCT Pub. No.: WO03/067823

PCT Pub. Date: Aug. 14, 2003

(65) Prior Publication Data

US 2005/0163131 A1    Jul. 28, 2005

(30) Foreign Application Priority Data

Feb. 8, 2002    (SE) .................................. 02/00226

(51) Int. Cl.
*G06F 15/16* (2006.01)
*G06F 15/173* (2006.01)

(52) U.S. Cl. .................. 709/227; 709/228; 709/229; 709/230; 709/245

(58) Field of Classification Search .................. 709/220, 709/223, 225, 227, 228, 229, 230, 245
See application file for complete search history.

(56) References Cited

U.S. PATENT DOCUMENTS

| | | | |
|---|---|---|---|
| 7,260,097 B2 * | 8/2007 | Casey | 370/392 |
| 7,320,036 B1 * | 1/2008 | Carrel et al. | 709/228 |
| 7,352,853 B1 * | 4/2008 | Shen et al. | 379/201.12 |
| 7,408,936 B2 * | 8/2008 | Ge et al. | 370/392 |
| 7,436,782 B2 * | 10/2008 | Ngo et al. | 370/254 |
| 7,450,595 B1 * | 11/2008 | Killian | 370/401 |
| 7,469,298 B2 * | 12/2008 | Kitada et al. | 709/236 |
| 2003/0140131 A1 * | 7/2003 | Chandrashekhar et al. | 709/223 |

FOREIGN PATENT DOCUMENTS

| | | |
|---|---|---|
| WO | WO9824224 A1 | 6/1998 |
| WO | WO0171983 A1 | 9/2001 |

OTHER PUBLICATIONS

Swedish Patent Office, International Search Report for PCT/SE03/00210, dated Apr. 22, 2003.

* cited by examiner

*Primary Examiner*—Rupal D Dharia
*Assistant Examiner*—Van Kim T Nguyen

(57) ABSTRACT

An access system (ACC1) for relating service providers (SP1-SPn) to users (U11-Um1) includes an edge access server (EAS) connecting the service providers and penults (P1-Pk) connecting the users. User devices (UD11-UD14) are connected via VLAN:s to a user ports (UP11) on the penult. The edge access server has service agents (SA1-SAn), an administrator (AD1) and a broadcast handler (BH1), which forms a handling system together with handlers (H1-Hk) in the penults. A user (U11) decision including VLAN, service (SP1) and user port (UP11) is sent to the administrator (AD1), which dynamically allocates to the relevant service agent (SA1) a MAC address, defining a relation (R11). A user device (UD11) broadcasts a DHCP request unicasted together with user port (UP11) to the braoadcast handler (BH1). The user device (UD11) gets its IP address and IP address to the service agent (SA1). The device (UD11) broadcasts an ARP request which is unicasted by the penult (P1), to get the MAC address to the service agent (SA1). The relations (R11, R21) are secure and can easily be controled.

6 Claims, 10 Drawing Sheets

ARRANGEMENTS AND METHODS IN AN ACCESS SYSTEM

TECHNICAL FIELD OF THE INVENTION

The present invention relates to a multiservice Ethernet access system and methods of establishing service access relations in the system, particularly for mobile users in the system.

DESCRIPTION OF RELATED ART

Ethernet has been developed mainly as a LAN (Local Area Network) technology, aiming to provide an efficient infrastructure for data networks within a company.

Originally it was developed for moderate speed shared media, but current technology applies mainly to point-to-point links up to 10 Gbit/s, interconnected by high capacity Ethernet switches, supporting virtual LAN, VLAN, as described in the standard IEEE 802.1q. A virtual LAN is a group of system, such as computers in a workgroup, that need to communicate with each other, and protocols that restrict the delivery of VLAN frames to members of the VLAN.

A LAN can be partitioned into multiple VLAN:s, where each VLAN is assigned a number called a VLAN identifier that identifies it uniquely within the LAN. A LAN contains at least one VLAN, the default VLAN.

Switches contain advanced self learning features and broadcast behaviour, which are well suited for the building of for example a corporate network, supporting a number of user groups.

However, in public service structures different requirements are put with respect to security, scaling and chargeability of services. In the public network, each user would ideally have his own completely isolated set of work groups available. A particular problem is then that the number of available VLAN tags, each tag defining a user, is limited to a number 4096, which is far from enough to serve hundreds of thousands of users.

In the international patent application No. WO 00/77983 is described a telecommunications system in which users can select services. Service networks and users are connected to a switched domain. The service networks are arranged into groups and each group is allocated a VLAN by configuring the ports in the switches. The users can select services by configuring their apparatuses to a selected one of the VLAN:s.

In the international patent application No. WO 00/79830 is described a telecommunication system in which users can select services. A switched domain has switches to which service providers and network terminals are connected. The switches have a user port connected to an uplink port in the network terminal. The user port is configured for the different service providers and the network terminals have corresponding service ports. The service ports corresponding to predetermined ones of the services are configured.

In these two applications the number of users is restricted.

In the European patent application EP 1045553 A2 is disclosed VLAN bridging of a network. The network has nodes for changing of addresses. A user sending a message via the network addresses it to a receiver. When the message reaches one of the network nodes the receiver address is changed into a temporary address for the network. This address is changed back when the message leaves the network via another of the network nodes.

SUMMARY OF THE INVENTION

The present invention is concerned with a problem how to create a multiservice access system with ethernet technology for a practically unrestricted number of users.

Another problem is how to offer the users services via the system, a number of the services practically covering all offered services.

A further problem is how to offer secure service bindings between the users and the service providers.

Still a problem is how to establish the service bindings as unicast bindings.

Still another problem is how to establish the service bindings as multicast bindings.

Yet another problem is how to control the traffic in the system.

A problem is also how to let a user, related to the access system, to be mobile.

The problem is solved by an access system including a node, called an edge access server, for connecting the service providers and a node, called a penult, for connecting the users, the nodes being interconnected by an arrangement supporting exchanging of Ethernet frames. The edge access server has service agents for the connecting of the service providers and the penults have user ports for connection to user networks. In a unicast case secure individual service access relations are provided in the access system, each relation being provided between one of the service agents and one of the user ports. In a multicast case the service access relations are provided between one of the service agents and a plurality of the user ports. The relation is extended for connecting of the user networks. A mobile user announces its presence at an alternative one of the user ports and the edge access server determines the corresponding service access relation.

Somewhat more in detail the user ports are designed for connecting of the user networks, which have each one Ethernet LAN with at least one VLAN. A set of the user ports is selected for mobile user devices. Each service access relation has a dynamically assigned MAC address assigned to the relevant one of the service agents. A set of these MAC addresses is reserved for the movable user devices. The service access relation is in one alternative defined by the dynamically assigned MAC address and in an alternative defined by the MAC address in combination with a further identifier. Initially the service access relation is bound to one of the user ports and, in the multicast case, bound to a plurality of the user ports. The access system has a broadcast handler system and broadcast messages involved in service access or service use are picked up by this system in the penult hosting the user port. Shaping of the traffic is performed with the aid of the dynamically assigned MAC address and, where appropriate, in combination with the further identifier. When the movable user device is attached to the alternative user port, the service access relation associated with the movable user device is determined by the edge access server.

A purpose with the invention is to give a practically unrestricted number of users access to services via an access system with Ethernet technology.

Another purpose is that the number of services that can be offered simultaneously to a user practically covers all offered services.

A further purpose is that service access relations between service providers and user devices shall be secure relations.

Still a purpose is that Ethernet technology shall be utilized for establishing service access relations in the network.

Still another purpose is to establish the service access relations as either unicast or multicast relations.

Yet a purpose is to control the traffic in the system.

A purpose is also for users to have devices which are mobile between the user ports of the access system.

An advantage with the invention is that a multiservice access network for a practically unrestricted number of users can be created, using already standardized Ethernet technology.

Another advantage is that that the number of services that simultaneously can be offered to a user practically covers all offered services.

A further advantage is that service access relations between service providers and users are secure relations.

Still an advantage is that Ethernet technology is utilized for establishing service bindings in the network.

Still another advantage is that the service access relations can be established as unicast relations or as multicast relations.

Yet other advantages are that no coordination of VLAN use between users is required in the unicast case, standard Ethernet components can be utilized both in the access system and in the user networks and the invention makes possible a simple administration and configuration of the access network.

An advantage is also that a user can have devices which are movable between different of the user ports of the access system.

The invention will now be described more in detail with the aid of embodiments and with reference to the enclosed figures.

DETAILED DESCRIPTION OF EMBODIMENTS

Figure 1:
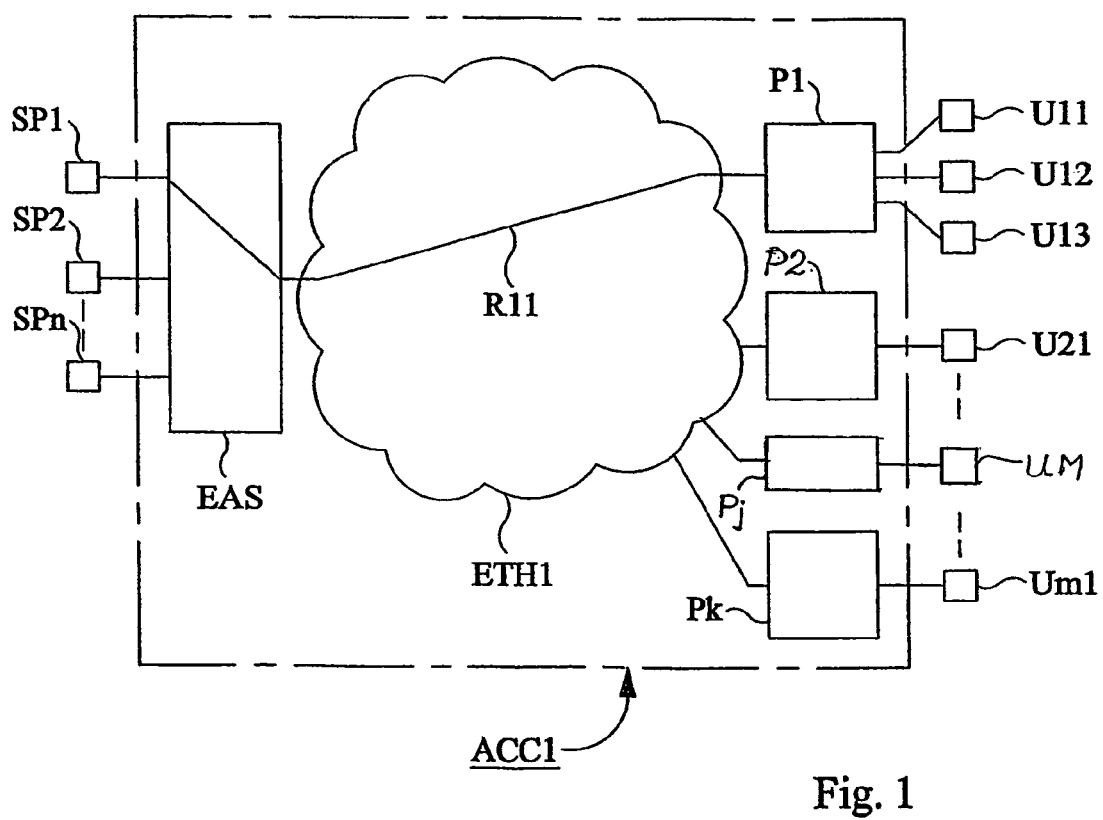
FIG. 1 shows a block schematic with an overview of an access system.

FIG. 1 shows a multiservice access system ACC1 to which users U11, U12, U13, U21, . . . , Um1, UM and service providers SP1, SP2, . . . , SPn are connected. An objective is to build the system such that the number of the users U11 . . . Um1, UM can be very great, e.g. in the range of several hundred thousands users. Another objective is that the number of the service providers SP1 . . . SPn, that each user can utilize, also is a great number, e.g. in the range of thousands of services. The access system ACC1 includes nodes P1, P2 . . . Pj, Pk, to which the users are connected with the aid of Ethernet technology. The access system also includes a node EAS, to which the service providers are connected. The node EAS is connected to the user's nodes P1-Pk via a network, which is an Ethernet based network ETH1 according to the standard IEEE 802.1q. This network is a large network and has among others a number of VLAN capable Ethernet switches, not shown in the figure. The users and the service providers are connected to each other by individual service access relations through the network ETH1, e.g. a relation R11 for the user U11 and the service provider SP1. These relations have a guaranteed quality of service and are secure in the meaning that only the user and the service provider having the relation can listen to or else utilize this relation. The relations will be described more in detail below.

Figure 2:
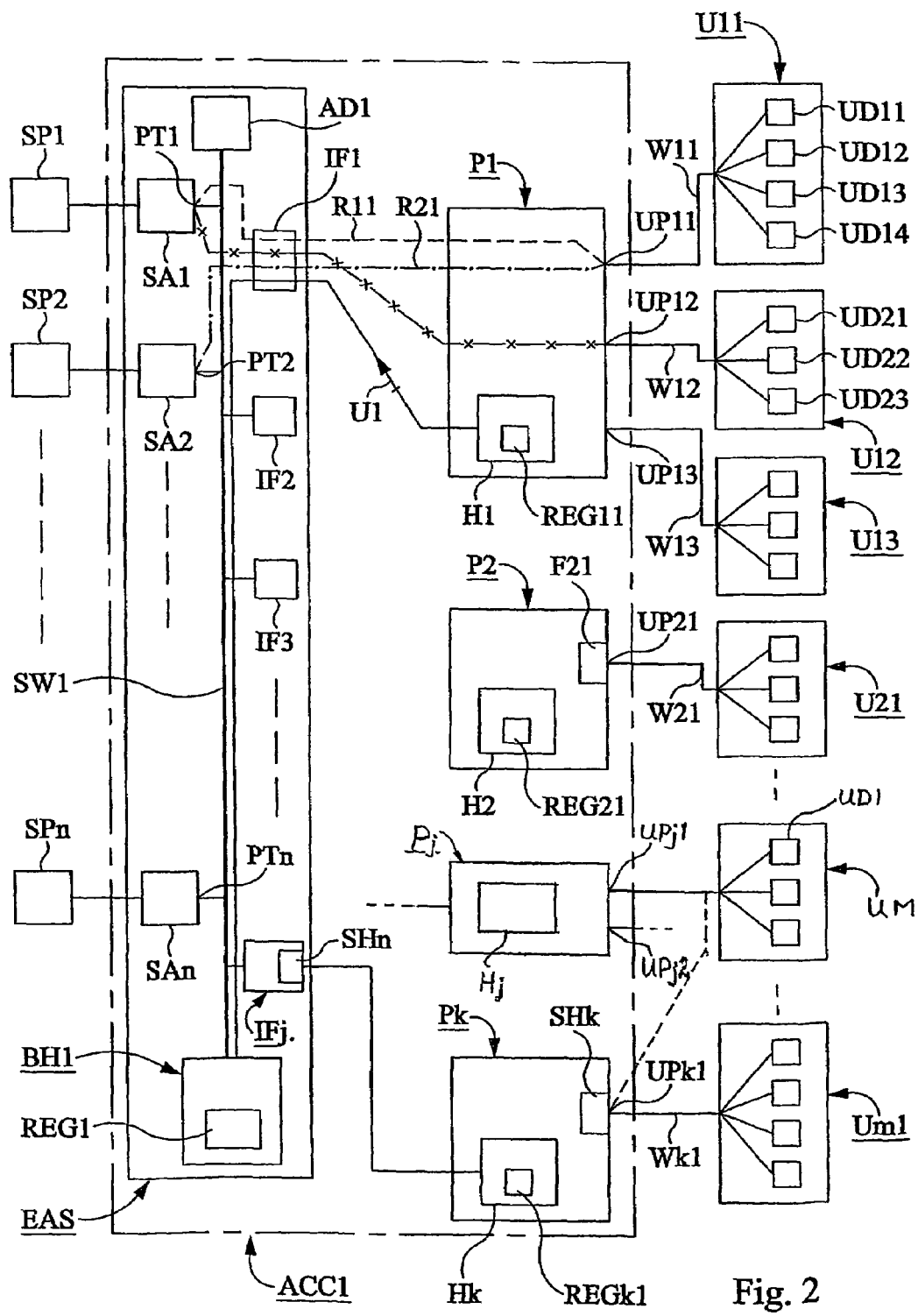
FIG. 2 shows a block schematic with more details for the access system of FIG. 1.

The embodiment in FIG. 1 is more closely shown in FIG. 2. The nodes P1, P2, . . . , Pj, Pk of the access system ACC1, hereinafter called penults, have user ports UP11, UP12, UP13, UP21, . . . , Upj1, Upj2, UPk1. Each of the user ports are connected to each a single one of the users U11-Um1, UM by wires W11-Wk1. The penults P1-Pk have each a handler H1, H2, . . . , Hj, Hk, which administers the user ports on the respective penult. The handlers have each a register REG11, REG21, . . . REGk1. The node EAS of the access system ACC1 is an edge access server, which in turn includes service agents SA1, SA2, . . . , SAn with each a respective service port PT1, PT2, . . . , PTn. The edge access server also has interfaces IF1, IF2, IF3, . . . IFj, an administating unit AD1 and a broadcast handler BH1 with a register REG1. The units of the edge access server are all bound to an Ethernet frame distribution system SW1. Each of the service agents are attributed to each a single one of the service providers SP1-SPn. The penults are connected to the edge access server EAS via the interfaces. The handlers H1-Hk in the penults are bound to the broadcast handler BH1 in the edge access server EAS, together forming a distributed handling system. The users U11-Um1, UM have each a number of user devices and e.g. the user UM has the device UD1, the user U11 has devices UD11, UD12, UD13 and UD14, and the user U12 has devices UD21, UD22 and UD23.

As mentioned, the network ETH1 and the users U1-Um1, UM utilize Ethernet technology. The Eternet technology therefore will be shortly commented below.

Figure 3A:
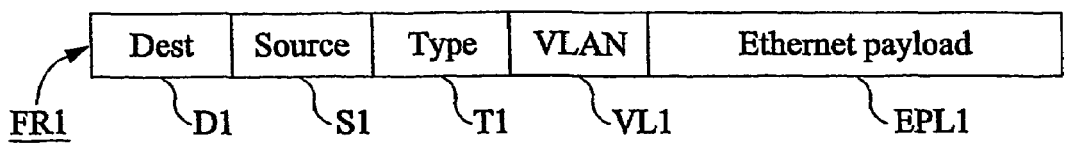
FIG. 3a shows a diagram over an ethernet frame.

In FIG. 3a is shown an Ethernet frame FR1 according to the standard IEEE802.1q. The frame has a field D1 for a destination address and a following field S1 for a source address. It also has a field T1 for defining a type of Ethernet frame. A field VL1 points out which VLAN that is concerned and a field EPL1 contains the payload, the message that is to be transmitted. An address F is reserved as a broadcast address.

Figure 3B:
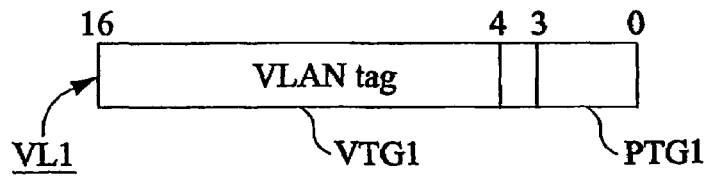
FIG. 3b shows a diagram over a VLAN tag in the frame.

In FIG. 3b the field VL1 is shown in some more detail. It has 16 bits which includes 3 bits for a priority tag PTG1, one indicator bit and 12 bits in a field VTG1 for a VLAN tag. It is this VLAN tag that points out the specific VLAN and as this tag has 12 bits it can distinguish $2^{12}=4096$ different VLANs.

Figure 3C:
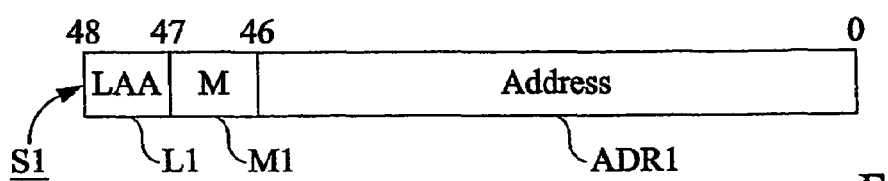
FIG. 3c shows a diagram over an address field in the frame.

FIG. 3c shows the source address field S1, which consists of 48 bits. One bit L1 points out whether the address is locally or globally administrated. One bit M1 points out whether the frame FR1 is a multicast frame used for e.g. IP multicast messages. The remaining 46 bits in a field ADR1 are address bits for MAC addresses. Any of the user devices has one globally administrated MAC address, which is given by the manufacturer of the device. The user device UD11 in FIG. 2 for example has an address UMAC1. The MAC address is unique for the device. From the description below it will also appear that the number of different service providers, e.g.

among the service providers SP1-SPn, that can be connected to one and the same of the users, is restricted by the number of the VLAN tags, i.e. the number $2^{12}$=4096.

Figure 4:
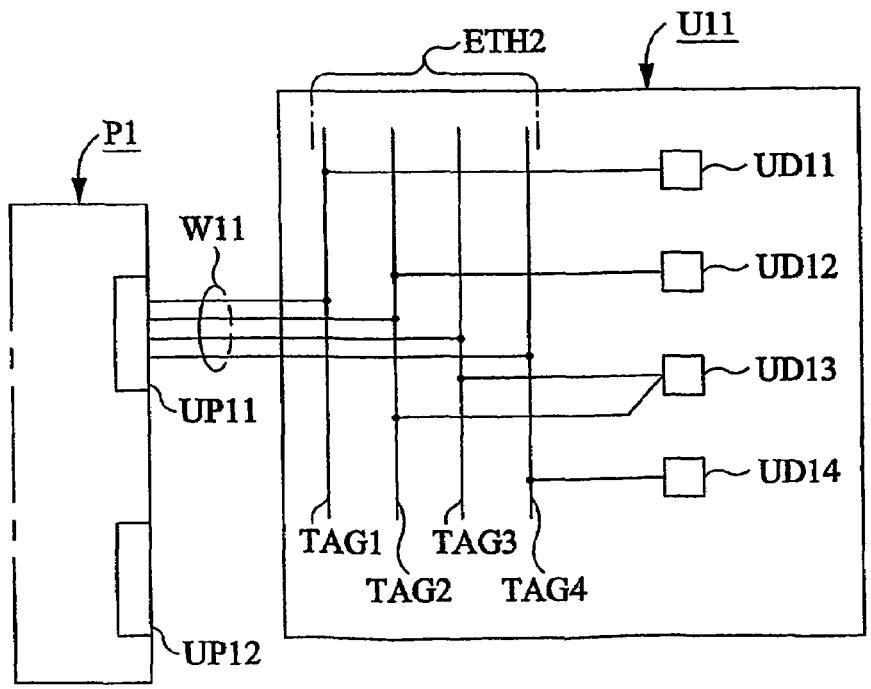
FIG. 4 shows a block schematic over a user in FIG. 1 with the user's VLAN:s.

In FIG. 4 are shown details how the user devices are related to the penult. The figure is a logic view over the relations. In the example the user U11 has an Ethernet LAN ETH2 containing user VLAN:s with tags TAG1, TAG2, TAG3 and TAG4, which LAN is connected to the user port PT11 via the wire W11. The user device UD11 is in turn attributed to the VLAN with tag TAG1, the device UD12 has the tag TAG2, the device UD13 has both the tags TAG2 and TAG3 and the device UD14 has the tag TAG4.

In a common Ethernet, on one hand, the different participants within each VLAN can communicate with each other freely and efficiently, which is a basic principle of the Ethernet. A first user that wants to contact a second user sends broadcast an address resolution protocol ARP with a request "Who has this IP address?". Everybody in the network can listen and the second user, that has the IP address in question, sends back his MAC address to the first user. A relation between the users is established. In an access system, on the other hand, a fundamental service is to both enable establishment of service bindings between users and service providers and, in such bindings, provide a transport service through the access system such that the service can be delivered to the user with high security and without any quality degradation. In a multi-service, multi service provider scenario several such bindings must be possible for each user at any given point in time, without interference between the bindings or between bindings for different users. In the present description will be disclosed how a multiservice access system, e.g. the access system ACC1, will fulfill these requirements on the services using Ethernet technology.

Figure 5:
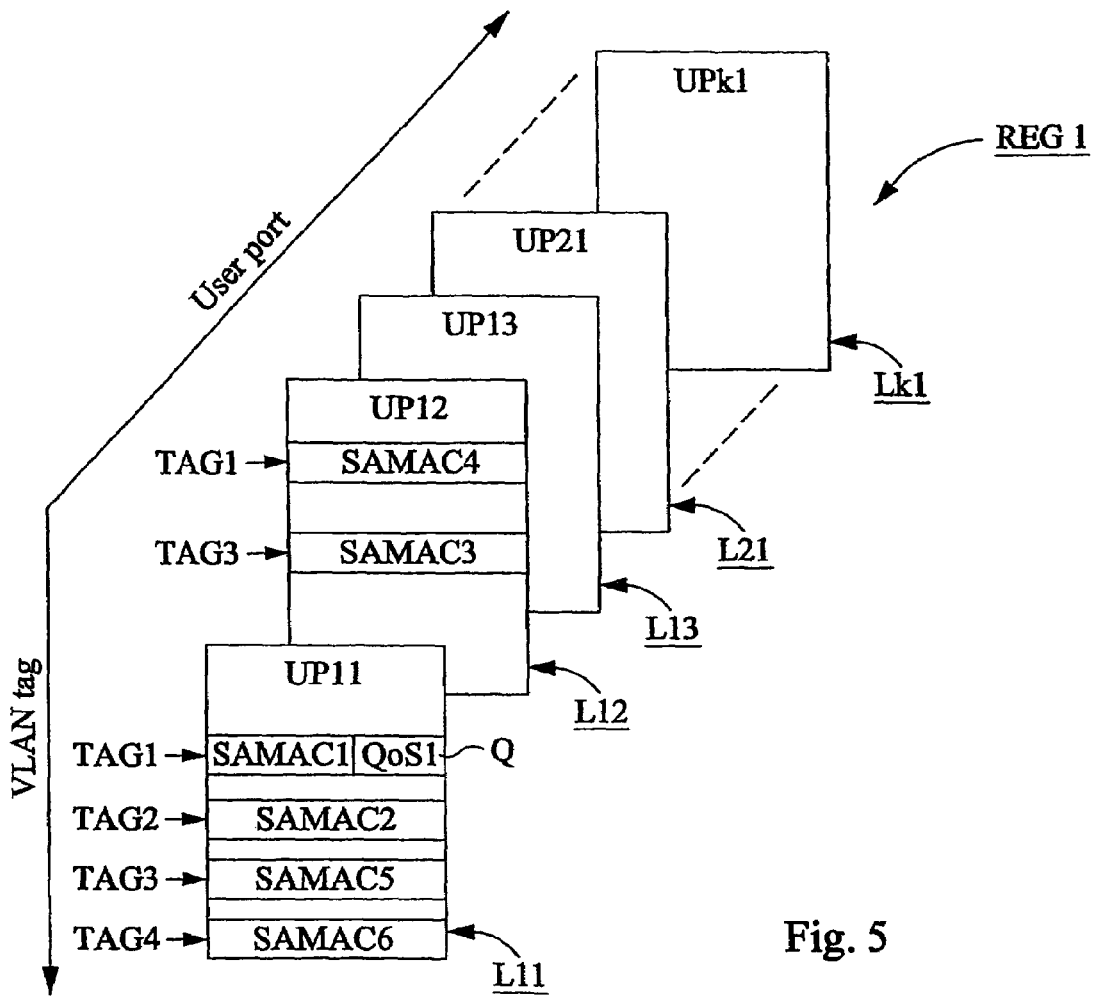
FIG. 5 shows a block diagram over a register in a broadcast handler.

To get the access network ACC1 to work, first the users decide which services they select and which VLAN they decide for a certain of the services. Each user can make his own decisions for the correspondence between VLAN and service, independently of the other users. In the present example the user U11 selects the service from the service provider SP1 and decides the VLAN with the tag TAG1 for this service. The user U11 also selects service from provider SP2 and decides the VLAN with the tag TAG2 for this service. Correspondingly the user U11 selects service provider SP3 on the VLAN with the tag TAG3 and service provider SP4 on the VLAN with the tag TAG4. Other users can select other services and decide other VLAN:s. The user U12, for example, selects the service from service provider SP1 and decides the VLAN with the tag TAG3 for this service. The user U12 also selects service from the service provider SP3 and decides the VLAN with the tag TAG1 for this service. The users then send their decisions to the administrative unit AD1 in the edge access server EAS, the users defining themselves by their respective user port. This sending can be performed by any suitable means, e.g. by assigning a web page, by a common letter or by a telephone call. The administrative unit AD1 also has the information about the correspondence between the service providers SP1-SPn and the service agents SA1-SAn. The administrative unit thus has triplets of information containing service agent, VLAN tag and user port. Gradually, when the users U11-Um1 send their information, the administrative unit AD1 will build up the register REG1 in the broadcast handler BH1, as shown in FIG. 5. For the different user ports UP11-UPk1 corresponding lists L11, L12, L13, L21 . . . Lk1 are created with fields corresponding to the VLAN tags. In this fields are written unique MAC addresses, which are dynamically allocated to the different service agent's respective service port by the administrative unit AD1.

In the example above the user U11 selected the service from service provider SP1 and decided the VLAN with the tag TAG1. The administrative unit dynamically allocates a unique MAC address SAMAC1 to the service port PT1 of the service agent SA1, connected to the service provider SP1. The address is allocated from a set of locally administrated addresses, LAA. This address is written on the list L11 for the user port UP11 and in a field pointed out by the VLAN tag TAG1. This means that the allocated MAC address SAMAC1 is bound to solely one information pair which has the user port UP11 and the identification tag TAG1 of the VLAN. Now the relation R11 is defined by the address SAMAC1 for the service port PT1, the address being bound to the user port UP11 and the VLAN tag TAG1. It should be noted that no other participant but the service provider SP1 and the user U11 can utilize the relation R11. Following the above examples, a unique MAC address SAMAC2 is dynamically allocated to the service port PT2 of the service agent SA2 and is written in a field defined by the VLAN tag TAG2 on the same list L11. A new relation R21 is created, which is defined by the address SAMAC2 and is bound to the user port UP11 and the VLAN with the tag TAG2. Also a MAC address SAMAC5 is allocated to the service agent SA3, service port PT3, in a field with the tag TAG3 and a MAC address SAMAC6 is allocated to the service agent SA4, service port PT4, in a field with the tag TAG4.

For the user U12 with the user port UP12 a unique MAC address SAMAC3 is dynamically allocated to the service port PT1 of the service agent SA1 and this address is written in a field pointed out by the VLAN tag TAG3 on the list L12. For the user U12 also a MAC address SAMAC4 is dynamically allocated to the service agent SA3, service port PT3, and this address is written in a field pointed out by the VLAN tag TAG1 on the list L12.

It appears from the above that, in the embodiment, each of the service ports PT1-PTn can get associated with a set of the unique MAC addresses for the service agents and that each of these MAC addresses is associated with only one particular of the user ports UP11-UPk1.

The relations between user port and service agent are built up as described above and are stored in the register REG1, but still the user devices can't utilize their respective service. It is in fact not even necessary until now that the user devices are connected. When the users intend to utilize the services they connect their user devices to the wires W11-Wk1 via the VLAN:s as is shown by an example in FIG. 4 for the user U11. Then there also must be built up a correspondence between IP addresses and MAC addresses. To get such a correspondence the conventional DHCP (Dynamic Host Configuration Protocol) is used in the present embodiment. The DHCP is an example on a more general service attachment request. By this protocol the different user devices will get their default gateway, which is the relevant service agent. Then they will also get their respective IP address and the IP address to the relevant service agent. This is performed in the following manner.

Figure 6:
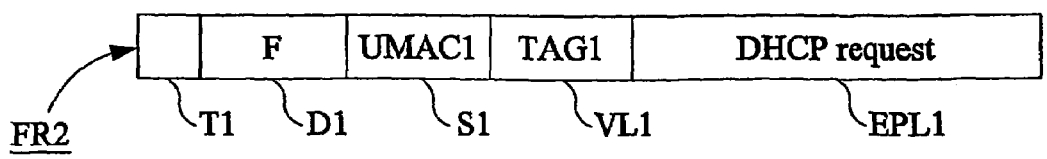
FIG. 6 shows a block schematic over an uplink Ethernet frame.
Figure 7:
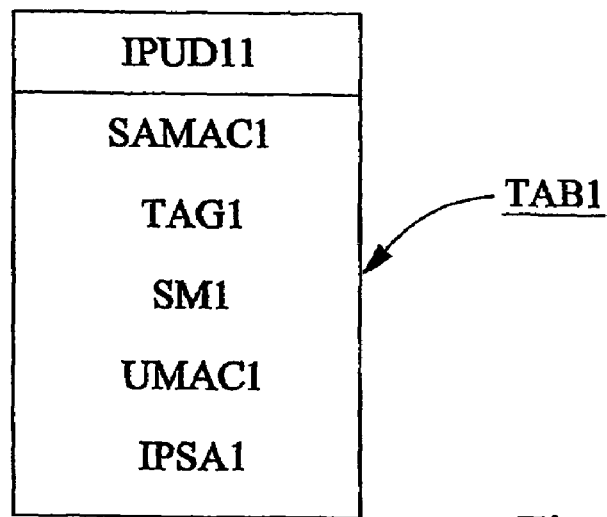
FIG. 7 shows a block with addresses.

The user device UD11 sends a frame FR2 with the addresses and payload as is shown in FIG. 6. In the destination address field D1 the broadcast address F is written. In the source address field S1 the MAC address UMAC1 for the user device UD11 is written and in the VLAN field VL1 the VLAN tag TAG1 is written, the tag appearing from FIG. 4. The message in the frame FR2 is "this is a DHCP request". The users U11-Um1 are connected via the Ethernet VLANs and have no information about the organization of the system ACC1. From the horizon of the users they act as if they were connected to a conventional Ethernet and it is therefore the user device UD11 sends the frame FR2 in FIG. 6 as a broadcast request. The aim from the view of the user device UD11 is that the broadcast request gives the user the identity of the relevant DHCP server. In the embodiment this sever is the service agent SA1, which has a set of IP addresses that it can allocate. The broadcast request in the frame FR2 first is intercepted by the handler H1 via the user port UP11. The handler H1, that gets the frame, FR2 via the port UP11, adds the identification for this port. It then packs the port identification together with the frame FR2 as a unicast message U1, see FIG. 2, and sends this message to the broadcast handler BH1 in the edge access server EAS. When getting the message U1, the broadcast handler BH1 looks in its register, the register REG1 of FIG. 5. With the aid of the user port UP11 and the VLAN tag TAG1 it finds the MAC address SAMAC1 for the service agent SA1. Now the default gateway, the service agent SA1, for the user device U11 is found. The user device UD11 also must be given an IP address itself and an IP address to its default gateway, which is performed in the following manner. The broadcast handler sends the request to the found service agent SA1, which now has the information as appears from a table TAB1 in FIG. 7. This information is the own port address SAMAC1, the VLAN tag TAG1, a subnet mask SM1, the user MAC address UMAC1 and the service agent's own IP address IPSA1. From its set of IP addresses the service agent SA1 now allocates an IP address IPUD11 to the user device UD11, which is associated with the content in the table TAB1. In a conventional manner, according to the DHCP protocol, information is transferred back to the user U11. The DHCP response includes the IP address IPSA1 of the service agent as default gateway address, the allocated IP address IPUD11 and the subnet mask SM1. The user device UD11 stores the IP address IPSA1 to the service agent SA1, its own IP address IPUD11 and the subnet mask, as host configuration data in a conventional manner.

In a corresponding manner the other devices of the user U11 send their DHCP requests with their MAC addresses and corresponding VLAN tag, the tags appearing from FIG. 4. Note that the user device UD13 has to send two DHCP requests with the tags TAG2 respective TAG3.

The relation R11 is now established on an IP level. When the service agent SA1 gets an IP packet with the address IPUD11 it finds the information in the table TAB1 and sends the packet to the correct receiver with the MAC address UMAC1. The user device UD11 also has the IP address IPSA1 to the service agent, its "default gateway". The user device UD11 utilizes in conventional manner an ARP request (Address Resolution Protocol) to get a MAC address to the IP address IPSA1. The user device UD11 therefore transmits broadcast the ARP message which is received by the handler H1 in the penult P1 via the user port UP11. The handler adds the identification for the user port and sends the message unicast to the broadcast handler BH1 in the edge access server EAS. The broadcast handler looks in its register REG1 on the list L11 for the user port UP11. On the VLAN tag TAG1 the broadcast handler finds the service agent MAC address SAMAC1. It transmits the address SAMAC1 to the handler H1, which in turn responds with the address SAMAC1 to the user device UD11. With the aid of the address SAMAC1 the user device UD11 now can utilize the relation R11 and get the service from the service provider SP1.

Figure 8:
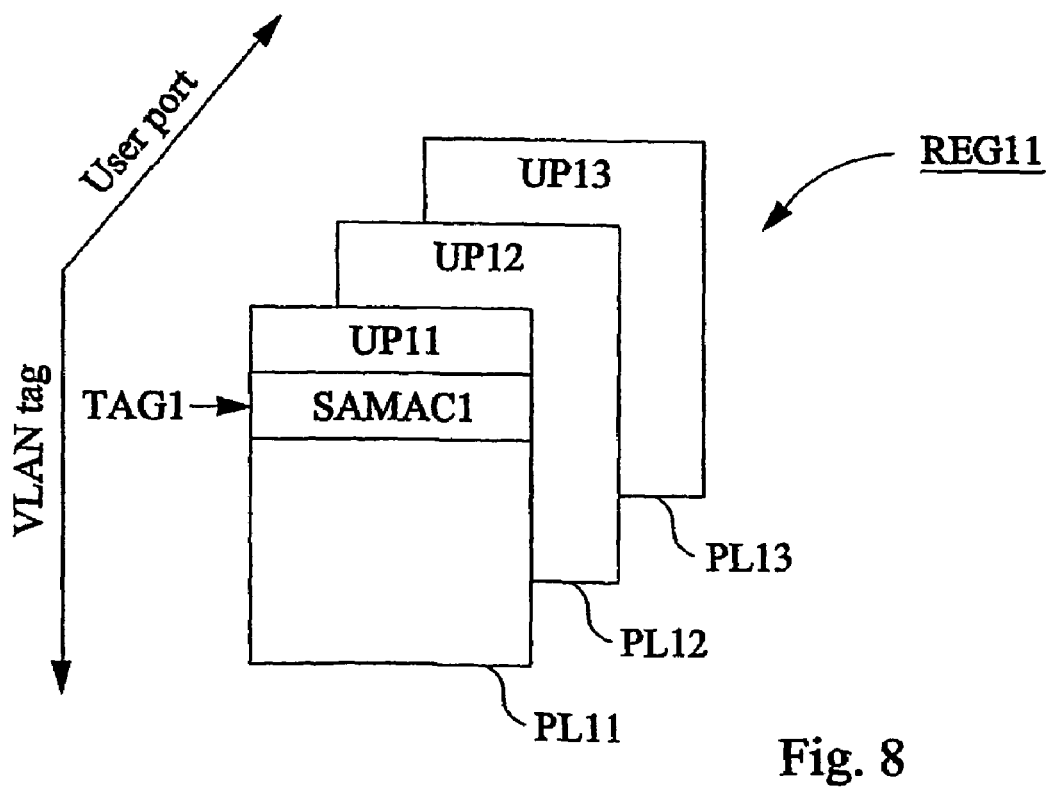
FIG. 8 shows a block diagram over a register in a handler.

In an alternative embodiment the handler H1 in the penult P1 successively creates the register REG11, shown in FIG. 8. The register REG11 is similar to the register REG1 in the broadcast handler BH1. The register REG11 only comprises the penult's own user ports UP11, UP12 and UP13 on respective lists PL11, PL12 and PL13 and the VLAN tags. When the user device UD11 has made the ARP request for the first time, as described above, the handler H1 gets back the MAC address SAMAC1 from the broadcast handler BH1. The handler H1 then fills in the address SAMAC1 in the register REG11. The next time the user device UD11 makes the ARP request, the handler H1 first looks in its own register, REG11 instead of sending the request to the broadcast handler BH1. The handler H1 finds the requested address SAMAC1 on the VLAN tag TAG1 and sends the address immediately back to the user device UD11.

In still an embodiment the register REG11 in the handler H1 is built up when the register REG1 in the broadcast handler BH1 is built up.

Below will be described a number of alternative embodiments.

In the above embodiment is described that a user first made the DHCP request via the access system ACC1 to get the IP addresses. This request then was followed by the ARP request. In an alternative embodiment the configuration is performed in an alternative way by alternative means. The request for the IP addresses can e.g. be performed by so called static configuration. After this configuration the user device makes the ARP request as described above to get the MAC address to its default gateway, the relevant service agent. In the same way as described above all ARP requests from the users, also when not preceded by a DHCP request, will be intercepted by the penult and result in the address to the respective default gateway. In this way all communication between different users is forced to flow to the service agent. It was also described that the dynamically allocated MAC addresses were locally administrated addresses, LAA. An alternative is that a set of MAC addresses is bought from the IEEE.

The service agent successively builds up a list for translating between IP addresses and user device MAC addresses. When it receives a packet it reads the IP address and if this address is within the service agent's own administrated subnet it looks for the IP address and finds the user MAC address. The service agent forwards the packet to this user MAC address and packets with any other IP address will be forwarded to the service provider.

In connection with FIGS. 1 and 2 was described that the distributed handler system comprised the handler H1 in the penult and the broadcast handler BH1 in the edge access server EAS. The penult and the edge access server were interconnected by the network ETH1. In an alternative embodiment the penult is a unit close to the edge access server. The transmission of messages between the penult and the edge access server is performed by Ethernet frames without the interconnecting network ETH1. It is even so that the penult can be regarded as a part of the edge access server itself. It should be noted that the edge access server EAS, the penults P1-Pk, the handler registers REG1, REG11-REGk1 and other parts of the access system not necessarily are physical units. Rather they are functional units which can be centralized or distributed depending on what is most appropriate in a situation.

In the embodiment in connection with FIG. 2 each of the service access relations was defined by solely one unique service agent MAC address, e.g. the relation R11 defined by the address SAMAC1. Each of the service agents therefore could have a set of different MAC addresses allocated to its service agent port, each address for one of the relations to the respective user port. In an alternative embodiment each service agent has only one single service agent MAC address for all its different service access relations to different of the user ports. The respective service access relation is in this embodiment defined by a complete access relation identifier including the service agent MAC address and a further service access relation identifier. This further identifier appears from the Ethernet header in the transmitted frames. An example on such an identifier is the combination of the VLAN tag and the user device MAC address.

With the abovementioned further service access relation identifier it is also possible, in an embodiment, that a plurality of MAC addresses are allocated to the port of one of the service agents. Each of these MAC addresses is then bound to a set of relations, each of the relations having its own further identifier.

In connection with FIG. 4 it was described that the user U11 had the Ethernet ETH2 with tagged VLAN:s to relate the user devices to the penult P1. As an alternative the user has a port based VLAN with a switch, that reads the tag and switches to a port for the relevant user device. Still an alternative is that the user has a MAC based VLAN and the penult checks that the user MAC address corresponds to the VLAN identifier.

In an embodiment the VLAN tag is transmitted from the service agent to the penult to transmit a requested service to the correct user device. In an alternative embodiment no VLAN tag is transmitted to the penult but only the service agent MAC address, e.g. SAMAC1. The penult itself derives the VLAN identity, e.g. the VLAN tag, from the unique service agent MAC address, defining the service access relation.

In connection with FIG. 2 it was described that the service providers SP1-SPn were connected to each one of the service agents SA1-San. In an alternative a service provider can be connected to two or more service agents.

Above is described the use of DHCP request. For other types of services than IP or other types of establishment of a relation between a user device and a service agent, other types of broadcast service attachment requests can be used. By the broadcast handler also those alternative requests are replied to by a service agent MAC address, which is identified in the same way as for the DHCP. As an example can be mentioned the use of PPP over Ethernet, PPPoE, where a broadcast PPPoE request will be responded with a service agent MAC address to the service agent acting as PPPoE server. Also, the ARP request is mentioned above. For other protocols than the IP protocol similar procedures are utilized to bring about address resolution.

Figure 9:
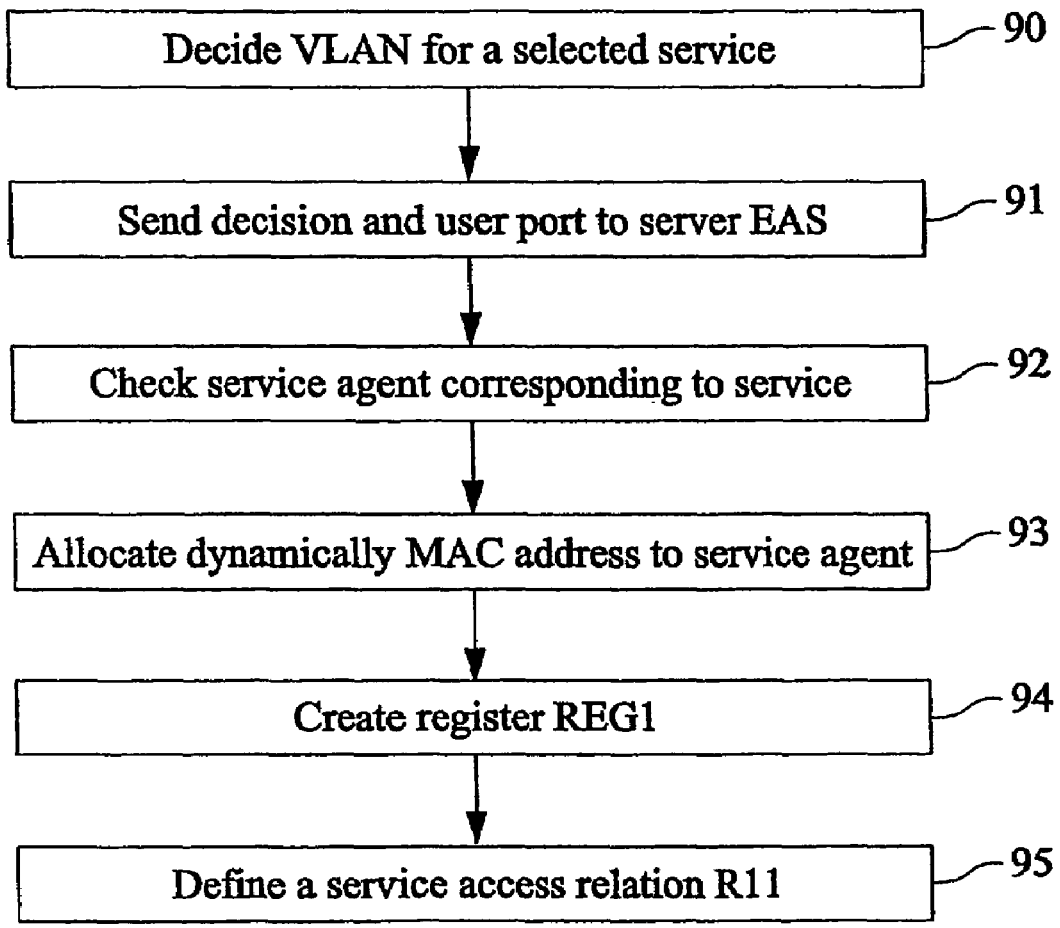
FIG. 9 shows a flow chart over a method for defining an access relation.

In connection with a flow chart in FIG. 9 will be described an overview over the above method of defining the service access relations in the multiservice access system ACC1. In a step 90 one of the users decides one of his VLAN:s for one of the services, e.g. the user U11 selects the service from the service provider SP1 and decides the VLAN with the tag TAG1 for the service. The user sends the the decided tag and the selected service together with his user port UP11 to the administrative unit AD1 in a step 91. In a step 92 the administrative unit checks which one of the service agents SA1-SAn that corresponds to the selected service and finds the service agent SA1. The administrative unit dynamically allocates the unique service agent MAC address SAMAC1 to the service agent SA1 in a step 93. The register REG1 is created in the broadcast handler BH1 in a step 94, in which register the service agent MAC address SAMAC1 is related to the user port UP11 and VLAN tag TAG1. Thereby the service access relation R11 is defined, step 95.

Figure 10:
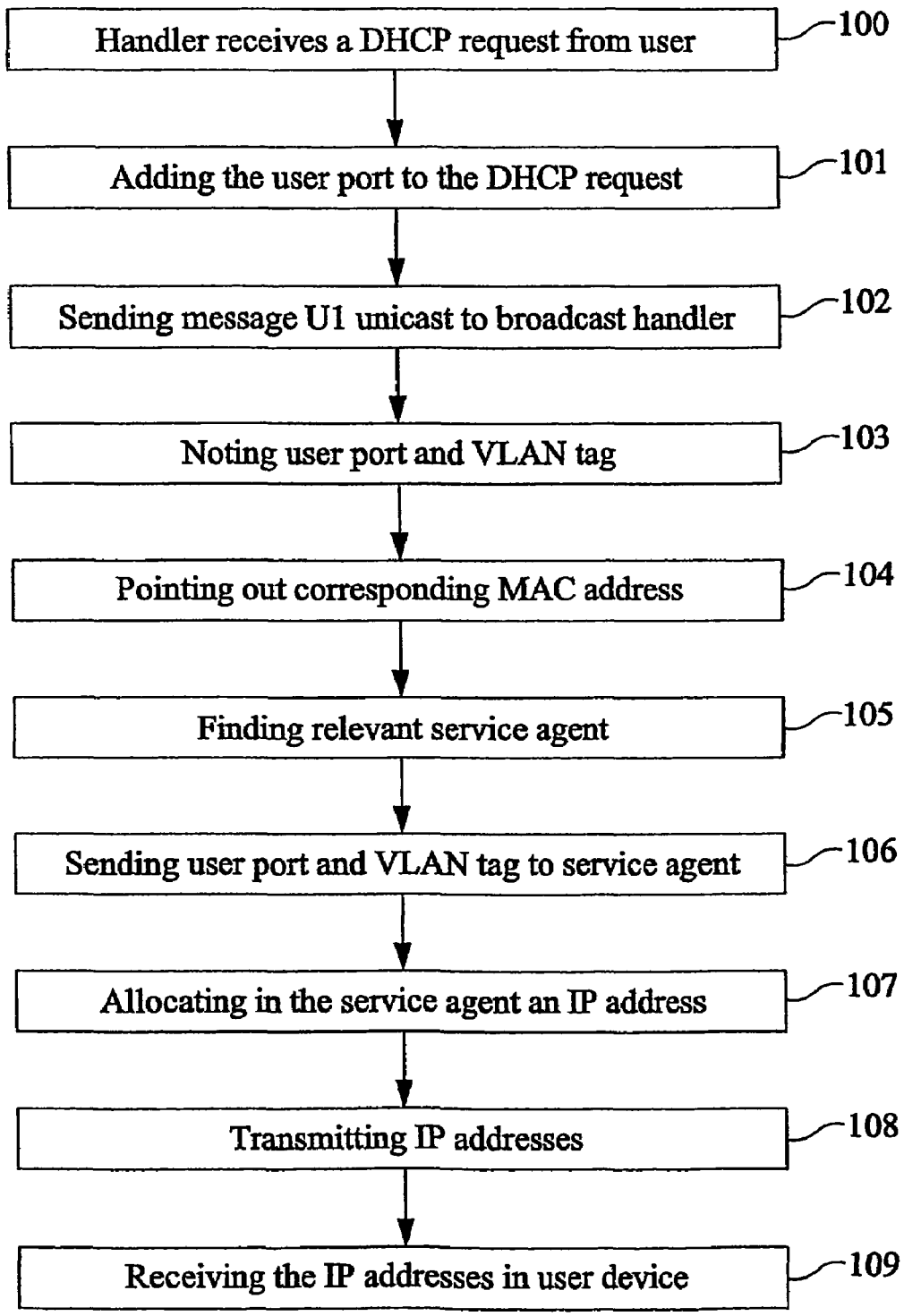
FIG. 10 shows a flow chart over a DHCP request method.
Figure 11:
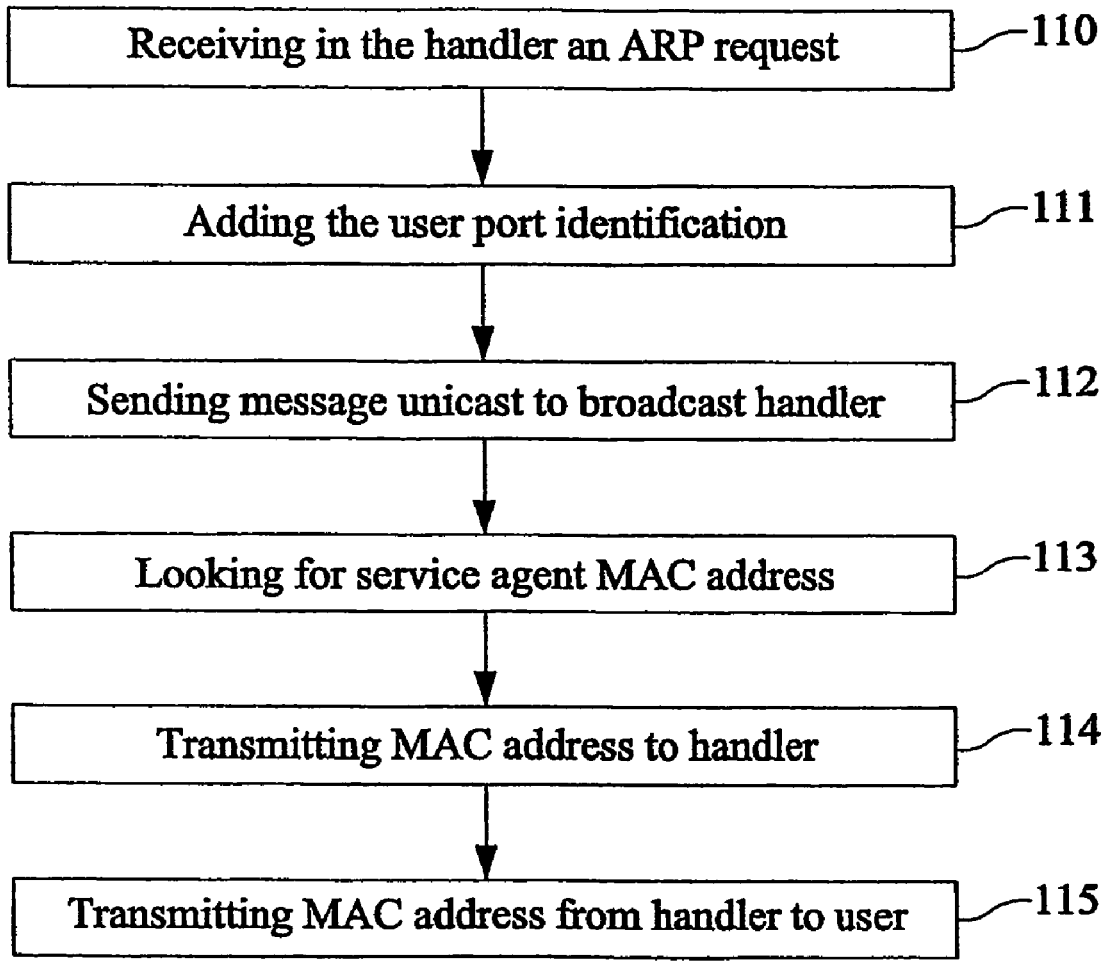
FIG. 11 shows a flow chart over an ARP request method.

The method of building up the correspondence between IP addresses and MAC addresses will be described in short in connection with flow charts in FIG. 10 and FIG. 11. In a first step 100 in FIG. 10 the handler H1 receives the broadcast DHCP request with the frame FR2 from the user device UD11. The frame includes both the user MAC address UMAC1 and the VLAN tag TAG1. The handler H1 adds the user port identification UP11 in a step 101 and in a step 102 the handler sends the complete message unicast to the broadcast handler BH1 in the edge access server EAS. The broadcast handler notes the user port UP11 and the VLAN tag TAG1 in a step 103 and, looking in its register REG1, it points out the corresponding unique service agent MAC address SAMAC1 in a step 104. In a step 105 the broadcast handler finds the relevant service agent SA1. Now the first part of the procedure is ready, finding the default gateway. Next part is to send IP addresses to the user device. In a step 106 the broadcast handler BH1 sends the user port and the VLAN tag to the service agent SA1. In a step 107 the service agent SA1 allocates the IP address IPUD11 to the user device UD11. In a conventional manner the service agent sends the DHCP response, including the own IP address IPSA1 and the allocated IP address IPUD11, step 108. In a step 109 the user device stores the received IP addresses. The relation R11 is now established on IP level. It should be noted that the procedure described in connection with FIG. 10, finding the default gateway in the steps 100 to 105 and the user device receiving the IP addresses in the steps 106 to 109, can be performed in alternative ways. One such way is by the static configuration procedure as mentioned above.

The procedure when the service access relation R11 is established in the reverse direction, from the user side to the service agent side, will be described shortly in connection with the flow chart in FIG. 11. In a first step 110 the handler H1 in the penult P1 receives an ARP message from the user device UD11 on the user port UP11. The handler adds the port identification in a step 111 and in a step 112 the handler H1 sends a message, including the ARP message and the port, unicast to the broadcast handler BH1. The broadcast handler looks in the register REG1 for the user port UP11 and the VLAN tag TAG1 and finds the service agent MAC address SAMAC1, step 113. In a step 114 the broadcast handler sends the address SAMAC1 to the handler H1 and in a step 115 the handler transmits the address SAMAC1 to the user and the address is received by the user device UD11. Alternatively the broadcast handler sends the MAC address SAMAC1 to the relevant service agent SA1 with an order to transmit the address to the handler H1.

Figure 12:
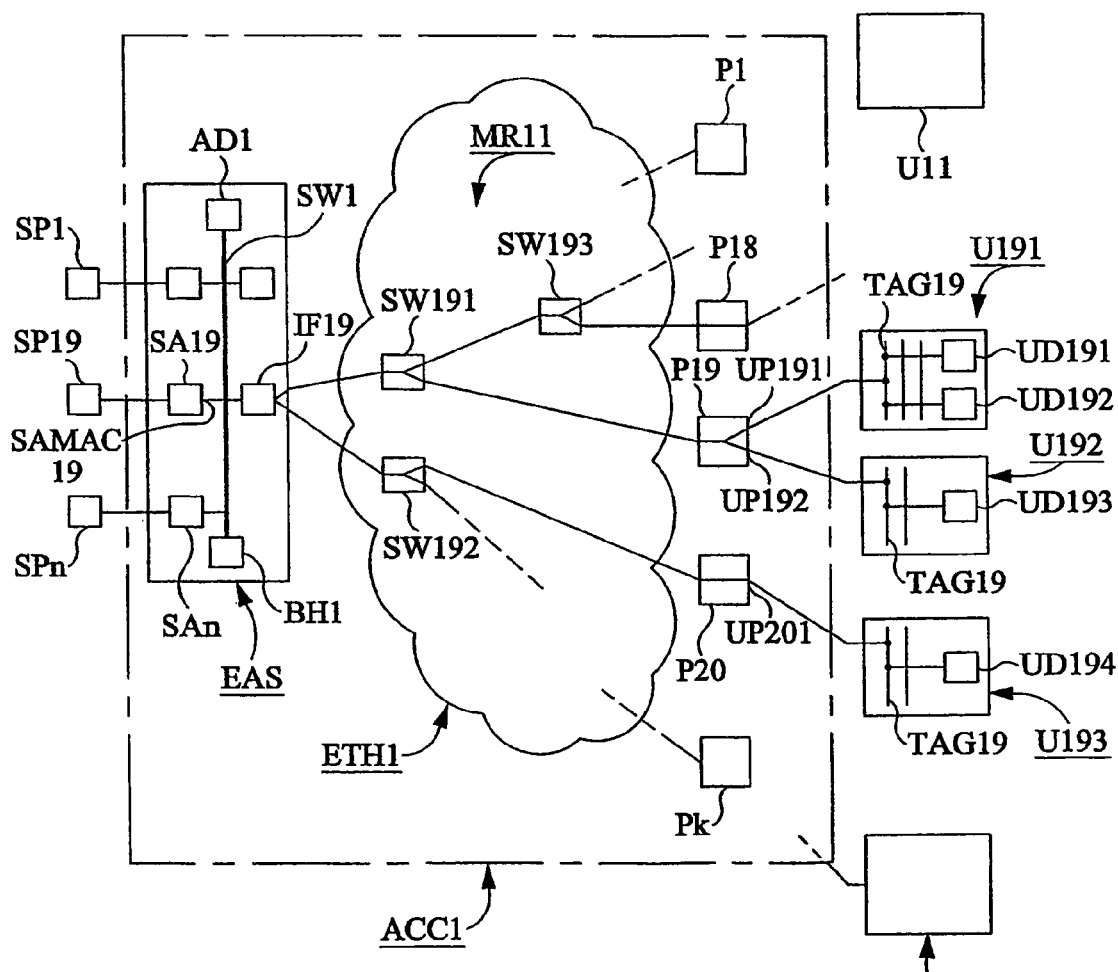
FIG. 12 shows a block shematic over the access system in a multicast situation.

The above described arrangements and procedures are related to unicast access between the service agents and the user ports on the penults. In connection with FIG. 12 will shortly be described an embodiment with multicast access. FIG. 12 shows a somewhat simplified view of FIG. 2 with the access system ACC1 interconnecting the service providers SP1-SPn and the users U11-Um1. The access system has, as above, the edge access server EAS and the penults P1-Pk interconnected by the Ethernet network ETH1. In this network are shown Ethernet switches SW191, SW192 and SW193 supporting multicast. Also the penults P18, P19 and P20 support multicast access. In the figure is shown a multicast access relation MR11 from the service agent SA19 to the penults P18, P19 and P20. The penult P19 has the user port UP191 with a connection to the user U191 and the user port UP192 connected to the user U192. The penult P20 has the user port P201 connected to the user U193. The user 191 has user devices UD191 and UD192 attributed to the user port UP191 via a VLAN with a VLAN tag TAG19 and the user U192 has a user device UD193 attributed to the user port UP192, also via the VLAN with the tag TAG19. The user U193 has a user device UD194 which is attributed to the user port UP201, also via the VLAN with the tag TAG19.

The aim with the multicast access relation MR11 is, naturally, to distribute a service from the service provider SP19 via the service agent SA19 to the users. Note that this distribution takes place only downstream, from the service provider to the users. The distribution is performed by branching up the service access relation MR11 in the edge access server, in the switches and in the penults. The relation MR11 to the users, which utilize the service from the provider SP19, is defined by one and the same MAC address, in the example a MAC address SAMAC19 allocated to the service agent SA19 by the administrative unit AD1. Each multicast flow from this service agent has a specific multicast address to which all participating users are listening. In the multicast frames transmitted via the relation MR11 the multicast bit M1 in FIG. 3c is set. Furthermore, the service from the service provider SP19 is distributed on one and the same Ethernet LAN, in the example the VLAN with the tag TAG19, which is bound to the multicast access relation MR11. In the multicast case the users can't decide their own VLAN:s for the service, but a common decision concerning the VLAN identification must be made. The establishing of the relation MR11 is performed in a corresponding way as described above. Also in the multicast access case the service agent for a certain service can have more than one assigned MAC address, in the same way as described above in the unicast case.

Figure 13:
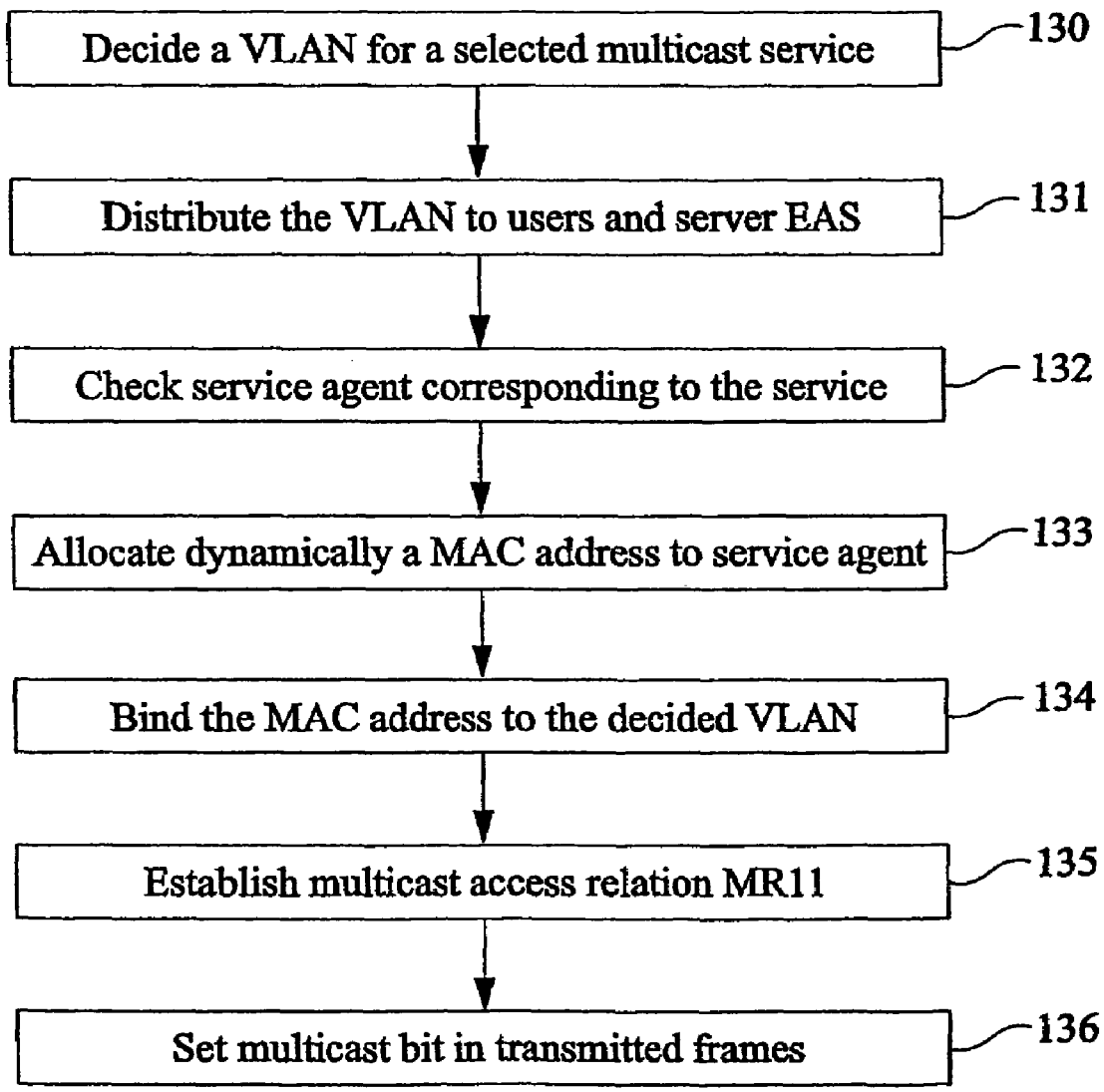
FIG. 13 shows a flow chart over a multicast method.

In connection with FIG. 13 will be described an overview over a procedure for establishing the multicast access relations. In a step 130 the VLAN with the tag TAG19 for a selected service from the service provider SP19 is decided. The decision is distributed to the edge access server EAS and to the users in a step 131. In a step 132 the administrative unit AD1 checks which one of the service agents SA1-SAn that corresponds to the selected service and finds the service agent SA19. The administrative unit AD1 dynamically allocates the service agent MAC address SAMAC19 to the service agent SA19 in a step 133, this MAC address defining the multicast access relation MR11. In a step 134 the MAC address SAMAC19 is bound to the decided VLAN with tag TAG19. In a step 135 the multicast access relation MR11 is established in a corresponding way as is described for the unicast relations. In a step 136 the multicast bit M1 is set for frames transmitted over the multicast service access relation MR11.

The services from the service providers SP1-SPn must be delivered with a certain quality level. The resources within the access system ACC1 are however limited, which delimits the quality level. An example on a limited resource is the available bandwidth. Many relations, as the relation R11, are to be transmitted via the connections between the service agent and a switch, between the switch and the penult and between the penult and the user VLAN, which relations have to share the available bandwidth. The quality of service for the relations are decided in agreements and are denoted for each relation in the register REG1 in FIG. 5. This is exemplified by a quality of service Q having a level QoS1 denoted on the list L11 for the relation R11, which relation is defined by the service agent MAC address SAMAC1. The quality values, e.g. a bandwidth parameter, are utilized when the traffic is shaped by shapers in the access system. As examples on shapers are shown, in FIG. 2, a shaper SHn in the edge access server EAS and a shaper SHk in the penult Pk. When shaping the traffic flow the shapers in the edge access server look on the service agent MAC addresses, which always appears in a transmitted frame either as source or destination address. With the aid of the address the shaper finds the corresponding value for the quality level. e.g. the value QoS1. In the embodiment when some of the relations were defined by its respective service agent MAC address and the further service access relation identifier, the shaper has to look also on the further identifier. The shaper SHk in the penult Pk can utilize the VLAN tag and the user port in a corresponding manner. The shaping includes in conventional manner buffering the frames, prioritizing with the aid of the priority tag PTG1 and scheduling.

It can happen that a participant tries to make more use of the access system ACC1 than the agreement allows, e.g. sends more traffic than it is agreed. This means that the participant's traffic even after shaping takes more bandwidth than the bandwidth parameter allows. The system can look upon the unique service agent MAC address in the frames and compare with the agreement. In the relation that uses too much bandwidth the system can apply policing and delete some of the transmitted frames. Also for this function the system has to look on the further service access relation identifier in the alternative embodiment for identifying the relations.

It can also happen that the users exchange their MAC addresses by some means and tries to utilize the access system ACC1 for communication between themselves and not with the service providers. To prevent such a behaviour the penults can have a traffic filter, e.g. a filter F21 at the user port UP21 in the penult P2. The filter reads the addresses in the transmitted frames. Frames from the user devices may only have the service agent MAC addresses or the broadcast address as destination address. Frames to the user devices may only have the service agent MAC addresses as source address. Other addresses are not allowed and frames with such addresses are deleted in the filter. Also, broadcast messages from a user, which are not to be handled by any of the service agents, are deleted.

The MAC addresses can have an internal address structure that is adapted to the structure of the access network ETH1. This can simplify the implementation of the network and its components in the access system ACC1.

The use of the above system and functions by the mobile user U1 is more closely described in the attached document "Mobility in Public Ethernet", enclosure 1.

Invention Disclosure: Mobility in Public Ethernet
(Encl. 1)

1 Name of Invention
Mobility in Public Ethernet

2 Inventor(s)
Ingmar Tönnby, Ulf Larsson, Egbert-Jan Sol, Eric Hjelmestam, Joacim Halén, Tom Rindborg 3 Priority
Priority claimed from application PCT/SE02/00226.

4 Background
The invention addresses how to implement user and terminal mobility, within the reach of a large scale Public Access network based on Ethernet technology. The invention encompasses mobility of both wire and wireless connection between user devices and terminal points of an access network.

5 State-of-the-art
The pending patent application "ARRANGEMENTS AND METHODS IN AN ACCESS SYSTEM", International patent application No. PCT/SE02/00226 (Ref [1]) describes the principles of a large scale Ethernet based access system, for users with a fixed attachment point during the lifetime of a service access session.

Wireless technologies, know under different names such as "WLAN", "Wi-Fi" (ref standard family IEEE 802.11), address wireless attachment to Ethernet network, served by based stations, known as "WLAN Hot-Spots". Several solutions exist to achieve access to IP networks over such an access system, including roaming (hand-over) methods when moving between the reach of different base stations.

The standard IEEE.802.11x describes a general protocol EAP (Extended Authentication Protocol) applied for authentication of WLAN devices.

IETF standards RFC2002, RFC3220 and other documents describe the concept of Mobile IP (MIP) as a means to support mobility of IP users between different subnets.

6 Problem

The method and arrangement described in [1] does not include support for users changing their location to another port of an access network, while retaining service bindings between a user device and a set of service providers.

The known solutions for WLAN are not easily adapted to very large-scale use in large access domains, with possibility for users to have service bindings to any selected service provider.

7 Solution

The specification in PCT/SE02/00226 is considered as a part of the current specification.

An objective with the invention is to allow for a terminal at the user endpoint of a service binding to move between a selected set of user ports, while retaining an unaffected binding to the selected service provider.

Another objective of the invention is to achieve end-to-end security for service bindings fore mobile users.

Yet another objective is to relieve the service providers from complexity caused by user mobility.

In a fixed access scenario, as described in PCT/SE02/00226, a user can only use an established service binding at the user port Upk1 at the penult Pk at which the service binding was established. The MAC address, SAMAC, of the involved service agent SA, reflects which user port and which service agent is involved in the service binding.

We introduce now the concept of a mobile service binding, allowing the user to connect to any of a selected set of user ports UP11, UP12, UPj1, UPj2, UPk1, while retaining the same SAMAC and layer 3 identity, such as an IP address.

As described in [1] the selection of wanted attributes of a service binding, such as identification of service provider, service and quality of service can be selected using a web page or many other means considered to be out of scope of the current invention. For users wanting a mobile service binding this is also stated by the user in this service selection process.

The procedure for establishing and supporting a mobile service binding is basically the same as for any other service binding, with the following exceptions:

The MAC address SAMAC at the service agent is selected from a set of reserved addresses for mobile service bindings. In a preferred embodiment this is done by reserving one bit, Bm, of the 46 available bits in the Locally Administrated Addresses range of Ethernet. This bit Bm is set 0 for all fixed service bindings and to 1 for mobile service bindings. In other embodiments a partial structure of SAMAC is used to directly, or indirectly through lookup in a register, identify if a SAMAC is associated with a mobile service binding.

The Penult behaviour and filtering rules is changed such that a penult port associated with mobile service bindings recognizes a SAMAC as the identifier of a mobile service binding and allows traffic for the service binding if the user is allowed to access through this user port.

When a roaming user attaches a device to another user port, this will be recognized by the penult, either by the occurrence of a broadcast ARP message or a frame sent to an SAMAC, not in the list of known SAMAC for this port. By examination of the reserved bit Bm it is recognized as the SAMAC of a mobile service binding. The penult will then send this frame, together with identification of the user port to the EAS, where the broadcast handler and a handler of mobile service bindings will determine if this user service binding is allowed for this user port or not. If allowed the penult filters of allowed SAMAC will be updated such that traffic to and from this SAMAC address is allowed to pass through.

For the handler of mobile service agents to determine if the user is allowed to attach at a new user port various methods can be used to ensure the authenticity of the roaming device. For wired scenarios, where a user disconnects the Ethernet wire and reconnects it at another port it may suffice that it is checked that the device MAC address is no longer connected to the previous user port. However in general, and in particular when using WLAN access methods a more secure method is needed. To achieve this, an authentication procedure, such as described in [4] is triggered by the handler of mobile service bindings, and only upon successful authentication the penult is informed to open the user port for the mobile service binding.

Similarly as described for the broadcast handler in [1], the handler of mobile service bindings can be distributed in various ways between the EAS and the penults in different embodiments.

In order to achieve seamless uninterrupted communication in a wireless mobile service binding, e.g. using a WLAN access network, the EAS can prepare penults servicing geographically adjacent access points (e.g. WLAN base stations) with information about a valid and active SAMAC and the communication sessions belonging to it. When a user moves to an already prepared user port only necessary authentication need to be performed at the moment of roaming.

A possible usage scenario for the invention, for a user initiating a mobile service binding and roaming to new location is as follows (see FIG. 2):

1. A user UM selects a service, associated to a service agent SA, and identifies a set of user ports [UPj1, UPj2, UPk1] at which the user wants to access the service. The user states the user device MAC address and other user credential necessary to identify the device.
2. The edge access server EAS allocates a unique MAC address SAMAC to the selected service agent. The SAMAC is constructed such that it can be recognized as being pertinent to a mobile service binding.
3. The user UM attaches its user device UD1 to the user port UPj1 included in the set of user ports for mobile devices.
4. The device requests an IP address by broadcasting a DHCP request. The broadcast message is trapped in the penult, and sent to the broadcast handler at the EAS.
5. Based on the user device MAC address the EAS identifies the device as belonging to the mobile service binding with the address SAMAC, associated to the service agent SAn.
6. Optionally an authentication process, using EAP, is initiated to check that the attached device is belonging to the user.
7. The service agent SAn is instructed to allocate an IP address and respond to the user device using DHCP.
8. EAS instructs the penult Pj to allow traffic between the service agent identified by SAMAC, and the user device UD1.
9. The user U1 can now use the IP address for any communication, as earlier described.

10. The user U1 now moves to another location and attaches the user device UD1 at another of the user ports in the set, user port UPk1.
11. The device UD1 announces its presence at the new user port UPk1 either by sending a special frame, by trying to send a frame to the SAMAC, or by sending a broadcast message such as an ARP.
12. The penult Pk discovers the presence of a new mobile user and alerts the EAS, which determines the mobile service access relation associated with the user device UD1.
13. Optionally an authentication process is started using EAP.
14. The penult Pk is instructed to open traffic between the user device UD1 and the SAMAC.
15. The service binding has now been re-established and the user U1 can proceed with any IP traffic session from the new point of access UPk1.
16. The EAS informs the penult Pj with the previously used user port UPj1 that the SAMAC is no longer associated to the user port.

The above usage scenario also applies for a user utilizing a multicast service from one of the service providers.

8 Merits of Invention

The invention can be used to provide mobility in very large-scale access networks built with Ethernet technology, with full security and full freedom for users to access services from any attached service provider.

9 References and Enclosures

[1] International patent application No. PCT/SE02/00226.
[2] RFC2002, RFC 3220
[3] IEEE 802.11,
[4] 802.11x
[5] Egbert-Jan Sol, Public wireless Ethernet. Draft conf. white paper.

10 Claims Proposal

A method of providing mobile McC
A method of identification of roaming devices
Arrangement of . . .

The invention claimed is:

1. A method in an access system for establishing service access relations at the Layer 2 (L2) level between service providers and movable devices of users, the system having:
   an edge access server having at least one service agent with a connection for one of the service providers;
   at least one penult having user ports for connecting the users; and
   an interconnecting arrangement, supporting exchanging of Ethernet frames, interconnecting the edge access server and the penults,
the method including the steps of:
   selecting a set of the user ports for use with the movable user devices;
   reserving a set of unassigned Ethernet MAC addresses for establishing service access relations at the L2 level to said movable user devices;
   dynamically allocating in the edge access server, unique Ethernet MAC addresses, selected from said reserved set of unassigned MAC addresses, to at least a part of the service agents;
   binding each of the unique service agent MAC addresses to a different L2 service access relation, said L2 service access relations being provided between the service agents and the user ports in the selected set of ports, wherein each L2 service access relation is provided between one of the service agents and at least one of the user ports in the selected set of ports;
   attaching one of the movable user devices to an alternative one of the user ports of the selected set of ports; and
   determining in the edge access server, the L2 service access relation associated with said attached movable user device.

2. A method in an access system for establishing service access relations at the Layer 2 (L2) level between service providers and movable devices of users, the system having:
   an edge access server having at least one service agent with a connection for one of the service providers;
   at least one penult having at least one user port for connecting the users; and
   an interconnecting arrangement, supporting exchanging of Ethernet frames, interconnecting the edge access server and the penults,
the method including the steps of:
   selecting a set of the user ports for use with the movable user devices;
   reserving a set of unassigned Ethernet MAC addresses for establishing service access relations at the L2 level to said movable user devices;
   dynamically allocating in the edge access server at least one Ethernet MAC address to each one of at least a part of the service agents, the MAC addresses being selected from said reserved set of unassigned MAC addresses;
   binding said Ethernet MAC addresses to at least each one of the service access relations which include the user ports in the selected set of ports;
   binding relation identifiers to said service access relations, wherein each identifier appears in a header of a transmitted Ethernet frame;
   attaching one of the movable user devices to an alternative one of the user ports of the selected set of ports; and
   determining in the edge access server at least one service access relation associated with said attached movable user device.

3. A method in an access system for establishing service access relations at the Layer 2 (L2) level between service providers and movable devices of users, the system having:
   an edge access server having at least one service agent with a connection for one of the service providers;
   at least one penult supporting multicast access having at least one user port for connecting at least one user Ethernet VLAN; and
   an interconnecting arrangement, supporting exchanging of Ethernet frames, interconnecting the edge access server and the penults, said arrangement including switches supporting multicast,
the method including the steps of:
   selecting a set of the user port for use with the movable user devices;
   reserving a set of unassigned Ethernet MAC addresses for establishing service access relations at the L2 level to said movable user devices;
   dynamically allocating in the edge access server, Ethernet MAC addresses to at least one of the service agents, each Ethernet MAC address defining a multicast L2 service access relation with at least one of the user ports, the MAC addresses being selected from said reserved set of unassigned MAC addresses;
   binding an identification of one of the user Ethernet VLANs to the multicast L2 service access relation, said relation including one of the user ports in the selected set of ports and said user Ethernet VLAN identification being intended for the users participating in the multicast service;

attaching one of the movable user devices to an alternative one of the user ports of the selected set of ports; and determining in the edge access server the L2 service access relation associated with said attached movable user device.

4. An access system for establishing service access relations at the Layer 2 (L2) level between service providers and movable devices of users, the system including:

an edge access server having at least one service agent with a connection for one of the service providers;

at least one penult having at least one user port for connecting one of the users, wherein a selected set of the user ports is provided for movable user devices;

an interconnecting arrangement, supporting exchanging of Ethernet frames, interconnecting the edge access server and the penults;

wherein the edge access server includes means for dynamically allocating unique Ethernet MAC addresses to at least a part of the service agents, said MAC addresses being allocated from a reserved set of unassigned Ethernet MAC addresses, the unique Ethernet MAC addresses defining each L2 service access relation with one of the user ports and being intended for L2 service access relations to said movable user devices, wherein when at least one of the movable user devices on one of the service access relations is attached to an alternative one of the user ports of the selected set of ports, the edge access server is arranged to determine the mobile service access relation associated with said attached movable user device.

5. An access system for establishing service access relations at the Layer 2 (L2) level between service providers and movable devices of users, the system including:

an edge access server having at least one service agent with a connection for one of the service providers;

at least one penult having at least one user port for connecting one of the users, wherein a selected set of the user ports is provided for movable user devices;

an interconnecting arrangement, supporting exchanging of Ethernet frames, interconnecting the edge access server and the penults;

wherein the edge access server includes means for dynamically allocating at least one Ethernet MAC address to each one of at least a part of the service agents, said MAC addresses being allocated from a reserved set of unassigned Ethernet MAC addresses, intended for service access relations to said movable user devices, the edge access server also including means for binding the Ethernet MAC addresses to the service access relations to the user ports and means for binding relation identifiers to the service access relations, said identifier appearing in a header of a transmitted Ethernet frame, wherein when at least one of the movable user devices on one of the service access relations is attached to an alternative one of the user ports of the selected set of port, the edge access server is arranged to determine the mobile service access relation associated with said attached movable user device.

6. An access system for establishing service access relations at the Layer 2 (L2) level between service providers and movable user devices of users, the system including:

an edge access server having at least one service agent with a connection for one of the service providers;

at least one penult supporting multicast access having at least one user port for connecting at least one user Ethernet VLAN; and an interconnecting arrangement, supporting exchanging of Ethernet frames, interconnecting the edge access server and the penults, said arrangement including switches supporting multicast, wherein the edge access server includes:

means for dynamically allocating Ethernet MAC addresses to at least one of the service agents, said MAC addresses being allocated from a reserved set of unassigned Ethernet MAC addresses intended for L2 service access relations to said movable user devices, wherein each Ethernet MAC address defines a multicast L2 service access relation with at least one of the user ports; and means for binding an identification of one of the user Ethernet VLANs to the multicast L2 service access relation, said user Ethernet VLAN identification being intended for the users participating in the multicast service, wherein when at least one of the movable user devices on one of the service access relations is attached to an alternative one of the user ports of the selected set of ports, the edge access server is arranged to determine the mobile service access relation associated with said attached movable user device.

* * * * *

UNITED STATES PATENT AND TRADEMARK OFFICE
CERTIFICATE OF CORRECTION

PATENT NO. : 7,711,824 B2  Page 1 of 1
APPLICATION NO. : 10/503184
DATED : May 4, 2010
INVENTOR(S) : Tonnby et al.

It is certified that error appears in the above-identified patent and that said Letters Patent is hereby corrected as shown below:

In Column 16, Line 51, in Claim 3, delete "port" and insert -- ports --, therefor.

In Column 17, Line 46, in Claim 5, delete "addresses," and insert -- addresses --, therefor.

In Column 18, Line 10, in Claim 5, delete "port," and insert -- ports, --, therefor.

Signed and Sealed this

Sixth Day of July, 2010

David J. Kappos
*Director of the United States Patent and Trademark Office*